(12) United States Patent
Kurosawa

(10) Patent No.: US 7,402,967 B2
(45) Date of Patent: Jul. 22, 2008

(54) DC POWER SOURCE

(75) Inventor: Atsushi Kurosawa, Iwata (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 46 days.

(21) Appl. No.: 11/482,371

(22) Filed: Jul. 7, 2006

(65) Prior Publication Data

US 2007/0018607 A1    Jan. 25, 2007

(30) Foreign Application Priority Data

Jul. 8, 2005    (JP)    ............................. 2005-199974

(51) Int. Cl.
*H02P 1/00*    (2006.01)
(52) U.S. Cl. ...................... 318/139; 318/801; 388/908; 388/931
(58) Field of Classification Search ................ 318/139, 318/801; 307/10.1, 18; 320/104; 388/908, 388/931
See application file for complete search history.

(56) References Cited

U.S. PATENT DOCUMENTS 5,389,824 A * 2/1995 Moroto et al. ............. 307/10.1
6,215,272 B1 * 4/2001 Ohara et al. ................ 320/104
2004/0066094 A1 * 4/2004 Suzuki et al. ................. 307/18

FOREIGN PATENT DOCUMENTS

JP    2000-12059    1/2000
JP    2002-118981    4/2002

* cited by examiner

*Primary Examiner*—Karen Masih
(74) *Attorney, Agent, or Firm*—Knobbe Martens Olson & Bear LLP (57) ABSTRACT

A DC power source includes one or more insulation type DC-DC converters and a plurality of cells, and is capable of reducing an amount of power loss at an insulation type DC-DC converter. The DC power source includes a pair of terminals for outputting electric power, a fuel cell and a secondary cell connected in parallel to the pair of terminals. An insulation type DC-DC converter is connected in series to either one of the fuel cell or the secondary cell.

22 Claims, 7 Drawing Sheets

DC POWER SOURCE

CROSS-REFERENCE TO RELATED APPLICATIONS

The present application is based on and claims priority under 35 U.S.C. 119 to Japanese Patent Application No. 2005-199974, filed on Jul. 8, 2005, the entire contents of which is hereby incorporated by reference and should be considered part of this specification.

BACKGROUND OF THE INVENTION

1. Field of the Invention

The present invention relates to a DC power source and more specifically to a DC power source including insulation type converters and a plurality of cells.

2. Description of the Related Art

Recently, the interest in fuel cells, which generate electricity via an electrochemical reaction between hydrogen and oxygen, as a source of power that operates efficiently and is environmentally friendly, has increased. Fuel cells are able to output a desired amount of power by controlling an amount of fuel gas supply. However, the output power response may be delayed due to a response delay in the gas supply.

As a means for addressing this disadvantage, technology has been suggested for configuring a power source by connecting a fuel cell and a secondary cell in parallel. For example, in the technology described in Japanese Patent No. JP 2000-12059, a combined use of a secondary cell and fuel cell is attempted by converting an output voltage of a fuel cell with a DC-DC converter.

In such an arrangement, further improvement in power output efficiency is required, as described in Japanese Patent No. JP 2002-118981. This reference describes "a DC power source comprising: a pair of terminals for outputting power, a fuel cell connected to the terminals, a secondary cell capable of charge and discharge, and a DC-DC converter, in which the secondary cell is connected to the terminals through the DC-DC converter in parallel with the fuel cell."

According to JP 2002-118981, "usually, power loss occurs in voltage conversions in a DC-DC converter. In the present invention, a DC-DC converter is provided to the side of a secondary cell, so power loss of output from a fuel cell can be prevented. In a power source with a combined use of fuel cell and secondary cell, a case that power is supplied mainly from a fuel cell is usual. Thus, by preventing loss at a fuel cell of a frequent use, output efficiency of entire power source can be improved. In the view that use of a fuel cell is frequent, the present invention is especially effective in the case a maximum output of a fuel cell is larger than a maximum output of a secondary cell".

However, in the system disclosed in JP 2002-118981, a DC-DC converter is connected to a pair of terminals in parallel (See FIG. 1 of JP 2002-188981). Therefore, output voltage of the DC-DC converter increases, and output power of the DC-DC converter also increases in a DC power source. Thus, an amount of power loss, e.g., lost as heat and so forth, increases in converting power of a secondary cell at the DC-DC converter.

Figure 7:
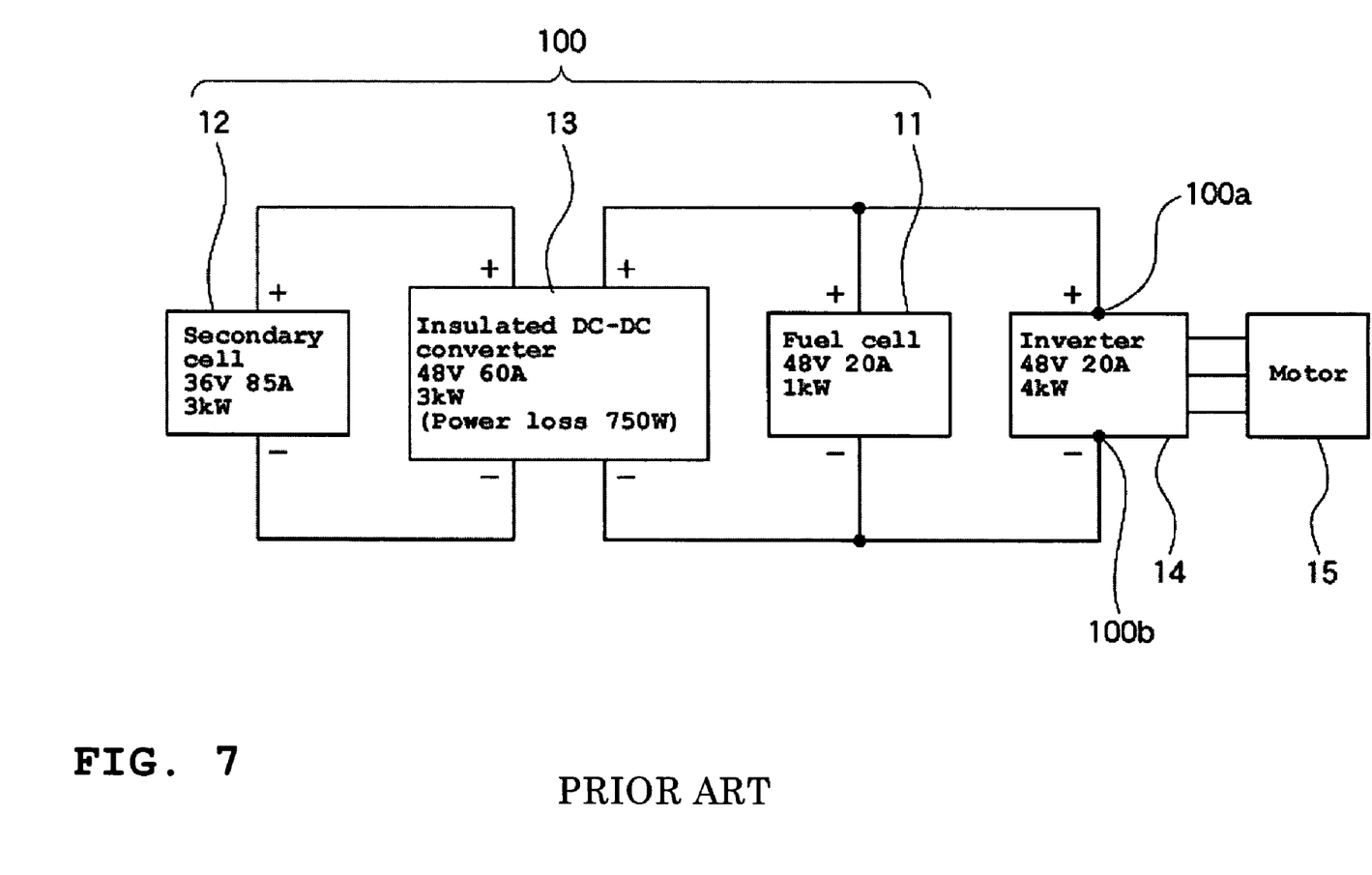
FIG. 7 is a schematic view of a configuration of a conventional DC power source connected to a motor through an inverter.

The DC power source according to JP 2002-118981 will be further described below. FIG. 7 is a schematic view of a configuration of a conventional DC power source connected to a motor through an inverter. FIG. 7 provides a simplified view of FIG. 1 in JP 2002-118981. In FIG. 7, a DC power source 100 is connected to a secondary cell 12 through a DC-DC converter 13, with a fuel cell 11 connected to a pair of terminals 100a and 100b. A motor 15 constituting a part of a "drive unit" is connected to the DC power source 100 through an inverter 14.

The DC-DC converter 13 in the DC-power source 100 is desirably 100% efficient (although this is not practicable). The DC power source 100 provides, for example, a voltage of 48V and a current of 80 A to the inverter 14, and approximately 4 kW of power produced by this is inverted and output to the motor 15. To make this possible, the fuel cell 11 needs to produce approximately 1 kW power with a voltage of 48V and current of 20 A, and the secondary cell needs to produce approximately 3 kW power with a voltage of 36V and current of 85 A. The voltage is converted by the DC-DC converter 13 so that the voltage, current and power of the secondary cell 12 are output to the DC-DC converter 13 as electric power of approximately 3 kW with a voltage of 48V and current of 60 A.

However, the efficiency of the DC-DC converter 13 cannot be 100%. For example, if the efficiency of the DC-DC converter 13 is 80%, the necessary power supply for the DC-DC converter 13 to output 3 kW is 3.75 kW, and approximately 750 w becomes power loss. Therefore, the output of 3.75 kW is necessary to cover the power loss at the DC-DC converter 13 by the output voltage of the secondary cell 12. Thus, it is desirable to reduce as much as possible the power loss (e.g., 750 w) at the DC-DC converter 13 so that the motor 15 can be driven efficiently.

SUMMARY OF THE INVENTION

In accordance with one aspect of the present invention, a DC power source is provided that includes an insulation type DC-DC converter and a plurality of cells, such that power loss at the insulation type DC-DC converter can be reduced.

In accordance with another aspect of the present invention, a DC power source is provided. The DC power source comprises a pair of terminals for outputting electric power. A first cell and a second cell are connected in parallel to the pair of terminals. An insulation type DC-DC converter is connected in series to either one of the first cell or the second cell.

In accordance with an additional aspect of the present invention, a DC power source is provided. The DC power source comprises a pair of terminals for outputting electric power, a fuel cell, a secondary cell, and an engine-driven type generator. The fuel cell, secondary cell and engine-driven type generator are connected in parallel to the pair of terminals. The DC power source also comprises at least one insulation type DC-DC converter, each insulation type DC-DC converter is individually connected in series to one of the fuel cell, the secondary cell and the engine driven type generator.

In accordance with a further aspect of the present invention, a DC power source is provided. The DC power source comprises a pair of terminals for outputting electric power. A first cell and a second cell are connected in parallel to the pair of terminals. The DC power source also comprises at least one insulation type DC-DC converter, each insulation type DC-DC converter connected to one of the first cell and the second cell. The DC power source also comprises means for reducing power loss at the at least one insulation-type DC-DC converter.

In accordance with another aspect of the present invention, a method for operating a DC power source connected to a drive unit for a vehicle is provided. The method comprises receiving a signal from an accelerator of the vehicle, and receiving a signal from a sensor configured to detect a rotational speed of the drive unit of the vehicle. The method also comprises controlling the operation of a DC-DC converter at least in part in response to said received signals to vary the voltage of the DC-DC converter.

BRIEF DESCRIPTION OF THE DRAWINGS

These and other features, aspects and advantages of the present invention will now be described in connection with preferred embodiments of the invention, in reference to the accompanying drawings. The illustrated embodiments, however, are merely examples and are not intended to limit the invention. The drawings include the following 7 figures.

DETAILED DESCRIPTION OF THE PREFERRED EMBODIMENT

Figure 1:
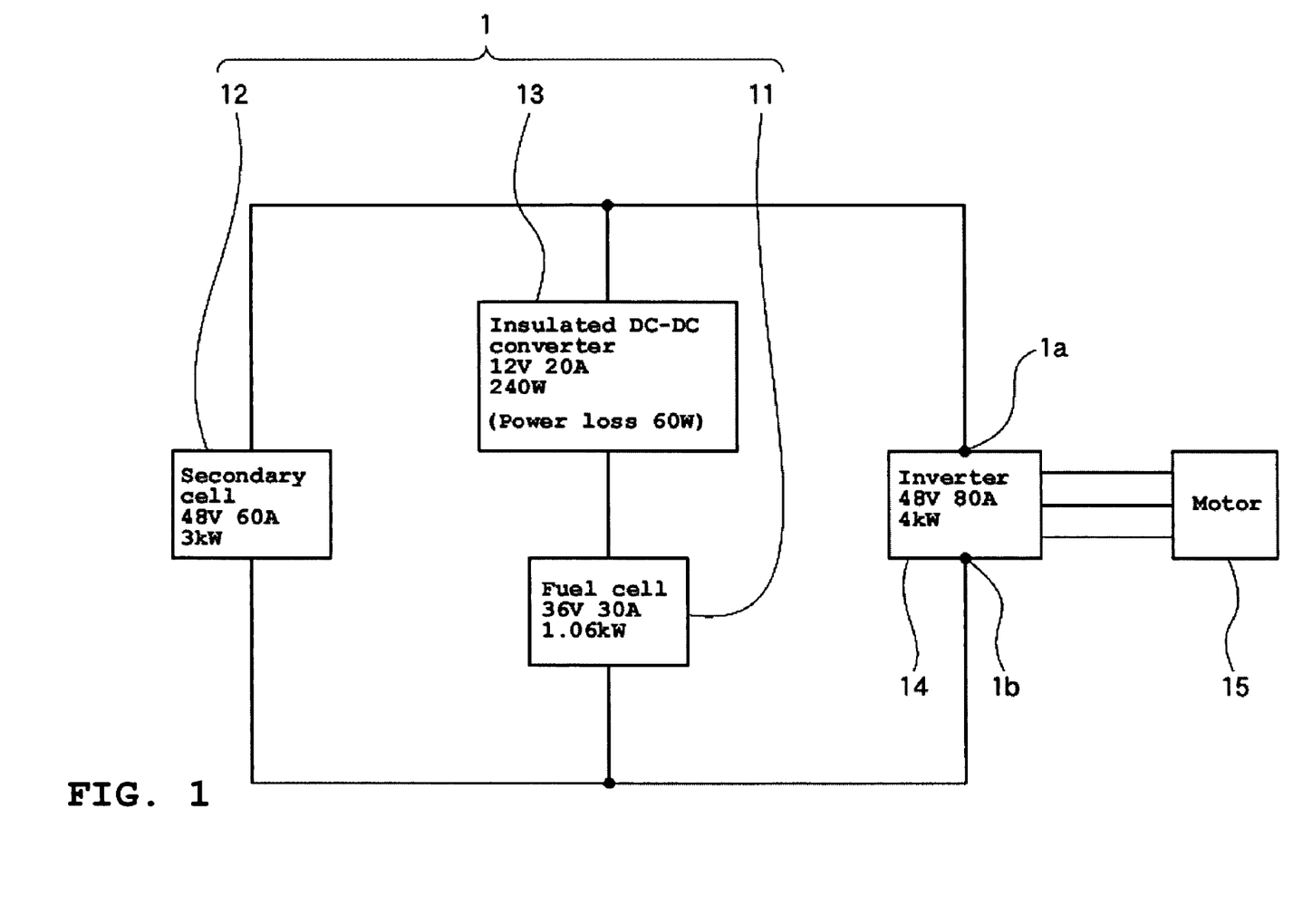
FIG. 1 is a schematic view of a configuration of one embodiment of a DC power source connected to a motor through an inverter.

FIG. 1 shows a DC power source 1 that includes a pair of terminals 1a and 1b for outputting electric power, a fuel cell 11 or "first cell", a secondary cell 12 or "second cell" connected in parallel to the pair of terminals 1a and 1b, and an insulation type DC-DC converter 13 connected in series to the fuel cell 11. The secondary cell 12 can be, for example, a battery or other energy-storage component. The DC power source 1 is connected to a motor 15 through an inverter 14. The motor 15 can constitute a drive unit or a part of the drive unit.

It is desired that the efficiency of the insulation type DC-DC converter 13 in the DC power source 1 be about 100%. The DC power source 1 preferably provides, for example, a voltage of 48V and a current of 80 A at the inverter 14, and approximately 4 kW power produced thereby is inverted and output to the motor 15. Though FIG. 1 shows particular voltage, current and power values associated with the fuel cell 11, secondary cell 12, DC-DC converter 13 and inverter 14, one of ordinary skill in the art will recognize that these values are only examples and that these components can operate at other suitable voltage, current and power values.

In this case, it can be assumed that approximately 1 kW of power is output with a voltage of 36V and a current of 30 A at the fuel cell 11, approximately 1 kW of power is produced with a voltage 48V and a current of 20 A as a total power of the fuel cell 11 and the insulation type DC-DC converter 13. Approximately 3 kW power is output with a voltage of 48V and a current of 60 A at the secondary cell 12.

Thus, a power output of approximately 4 kW at the inverter 14 is the sum of approximately 1 kW power produced at the insulation type DC-DC converter 13 and the fuel cell 11, and approximately 3 kW power produced at the secondary cell 12.

Figure 2:
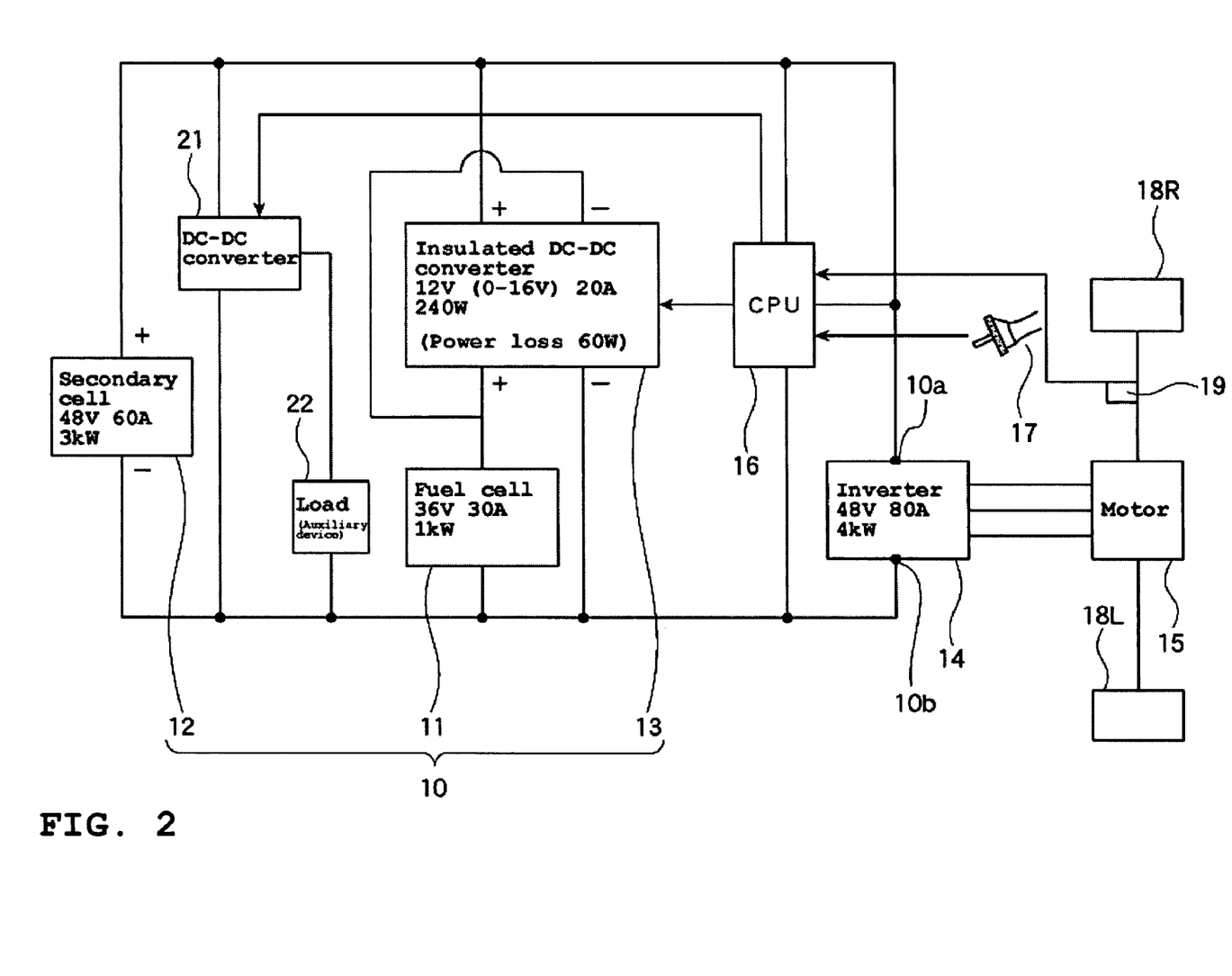
FIG. 2 is a schematic view of a configuration of another embodiment of a DC power source connected to a motor through an inverter.

Further, although not illustrated in FIG. 1, a current 30 A flowing at the fuel cell 11 is divided into a current 10 A flowing into the input side of the DC-DC converter 13, and a current 20 A flowing into the output side of the DC-DC converter 13 (See FIG. 2).

However, eventually, the efficiency of the insulation type DC-DC converter 13 cannot be 100%. For example, if the efficiency of the insulation type DC-DC converter 13 is 80%, the necessary power supply for the insulation type DC-DC converter 13 is 300 W in order to output 240 W, and thus the power loss is 60 W. Therefore, to cover the power loss at the DC-DC converter 13 with an output power of the fuel cell 11, approximately 1.06 kW power needs to be output by the fuel cell 11.

Thus, in the DC power source 100 shown in FIG. 7, a total power output of approximately 4.75 kW, approximately 3.75 kW at the secondary cell 12 and approximately 1 kW at the fuel cell 11, needs to be output to supplement the power loss of 750 W at the insulation type DC-DC converter 13 in order to supply an electric power of approximately 4 kW to the inverter 14. On the other hand, in the DC power source 1 shown in FIG. 1, a total electric power of approximately 4.06 kW, production of approximately 1.06 kW at the fuel cell 11 and approximately 3 kW at the secondary cell 12, is enough to supplement the power loss of 60 W at the insulation type DC-DC converter 13 in order to supply an electric power of approximately 4 kW to the inverter 14.

Therefore, because a voltage output by the insulation type DC-DC converter 13 in FIG. 1 can be smaller, output power can be smaller. Thus, a power loss at insulation type DC-DC converter 13 is reduced.

Also, the efficiency of power produced at the fuel cell 11 and the secondary cell 12, which is supplied to the motor 15, is increased. Thus, the output efficiency of the DC power source 1 with a combined use of the fuel cell 11 and the secondary cell 12 is improved.

The insulation type DC-DC converter 13 can be connected in series to either cell 11 or 12 with a lower voltage between the fuel cell 11 and the secondary cell 12. For example, FIG. 1 shows one embodiment in which the DC-DC converter 13 is connected in series to the fuel cell 11 and in parallel to the secondary cell 12. In another embodiment, the DC-DC converter is connected in series to the secondary cell 12 and in parallel to the fuel cell 11 (see FIG. 3). The voltage of the insulation type DC-DC converter 13 is preferably variable for adding a voltage produced at either cell 11 or 12 with a lower voltage between the fuel cell 11 and the secondary cell 12. For example, in the DC power source 1, a voltage at the fuel cell 11 is 36V and a voltage at the secondary cell 12 is 48V, so the voltages need to be the same in the case the cells 11 and 12 are connected in parallel. Therefore, the insulation type DC-DC converter 13 is connected to the fuel cell 11 with a lower voltage in series, a voltage of 36V at the fuel cell 11 and a voltage of 12V at the insulation type DC-DC converter 13 are summed to be 48V, and matched with a voltage of 48V at the secondary cell 12. With such a connection, an output voltage of the insulation type DC-DC converter 13 is smaller than a voltage applied to the pair of terminals 1a and 1b for outputting electric power. Therefore, a voltage to be converted is smaller, and power loss is reduced.

The insulation type DC-DC converter 13 is connected to either cell with a lower current between the fuel cell 11 and the secondary cell 12 in series. It is because a connection to the cell 11 or 12 with a lower current reduces the voltage converted by the insulation type DC-DC converter 13 and also reduces power loss. For example, in the DC power source 1, because a current of 30 A at the fuel cell 11 is smaller than a current of 60 A at the secondary cell 12, the insulation type DC-DC converter 13 is connected to the fuel cell 11 in series.

FIG. 2 illustrates another embodiment of a DC power source 10. The DC power source 10 is similar to the DC power source 1 discussed above with reference to FIG. 1, except as noted below. Thus, the reference numerals used to designate the various components of the DC power source 10 are identical to those used for identifying the corresponding components of the DC power source 1. Though certain values for voltage, current and power are illustrated in FIG. 2, one of ordinary skill in the art will recognize that these values are only examples and that the fuel cell 11, secondary cell 12, DC-DC converter 13 and inverter 14 can operate at other suitable voltage, current and power values.

FIG. 2 illustrates a DC power source 10 that includes a pair of terminals 10a and 10b, a fuel cell 11 and a secondary cell 12 connected to the pair of terminals 10a and 10b in parallel, and an insulation type DC-DC converter 13 connected to the fuel cell 11 in series. In addition, the DC power source 10 is connected to a motor 15 through an inverter 14, and each device and the like 16, 17, 18R, 18L, 19, 21, and 22 mentioned below are connected to the DC power source 10.

In the illustrated embodiment, the insulation type DC-DC converter 13 is preferably configured so that a voltage is variable between about 0V and about 16V. Preferably, a voltage applied to the fuel cell 11 decreases when a current flowing at the fuel cell 11 becomes large (e.g., increases above a predetermined value) and the insulation type DC-DC converter 13, with said variable voltage, supplements the decrease in voltage at the fuel cell 11. The voltages applied to the fuel cell 11 and the insulation type DC-DC converter 13 can thus stabilize, and electric power provided by the DC power source 10 can also stabilize.

In the DC power source 10, as shown in FIG. 2, a voltage of the secondary cell 12 is 48V and a voltage of the fuel cell 11 is 36V, so a voltage of the insulation type DC-DC converter 13 is adjusted to 12V.

Also, as shown in FIG. 2, wheels 18R and 18L are connected to the motor 15, and a sensor 19 for detecting a rotational speed of the motor 15 is provided on the motor 15.

Further, in the DC power source 10, an auxiliary device 22, such as light and blinker is connected in parallel to the pair of terminals 10a and 10b, and a DC-DC converter 21 is connected to this auxiliary device 22.

Also, a CPU 16 (an abbreviation for "Central Processing Unit", hereinafter referred to as the same), or similar controller, is provided. The CPU 16 preferably receives signals from an accelerator 17 and the sensor 19, and also preferably receives a voltage value and a current value detected about the DC power source 10. The CPU 16 preferably communicates commands to the insulation type DC-DC converter 13 and the DC-DC converter 21 to control the operation of the DC-DC converter 13 and the DC-DC converter 21. For example, in one embodiment the CPU 16 can communicate a command to the DC-DC converter 13 to vary the voltage of the DC-DC converter 13 based on the amount of current flowing through the fuel cell 11.

Actions and effects produced in the insulation type DC-DC converter 13 are the same as in the DC power source 1, discussed above.

Figure 3:
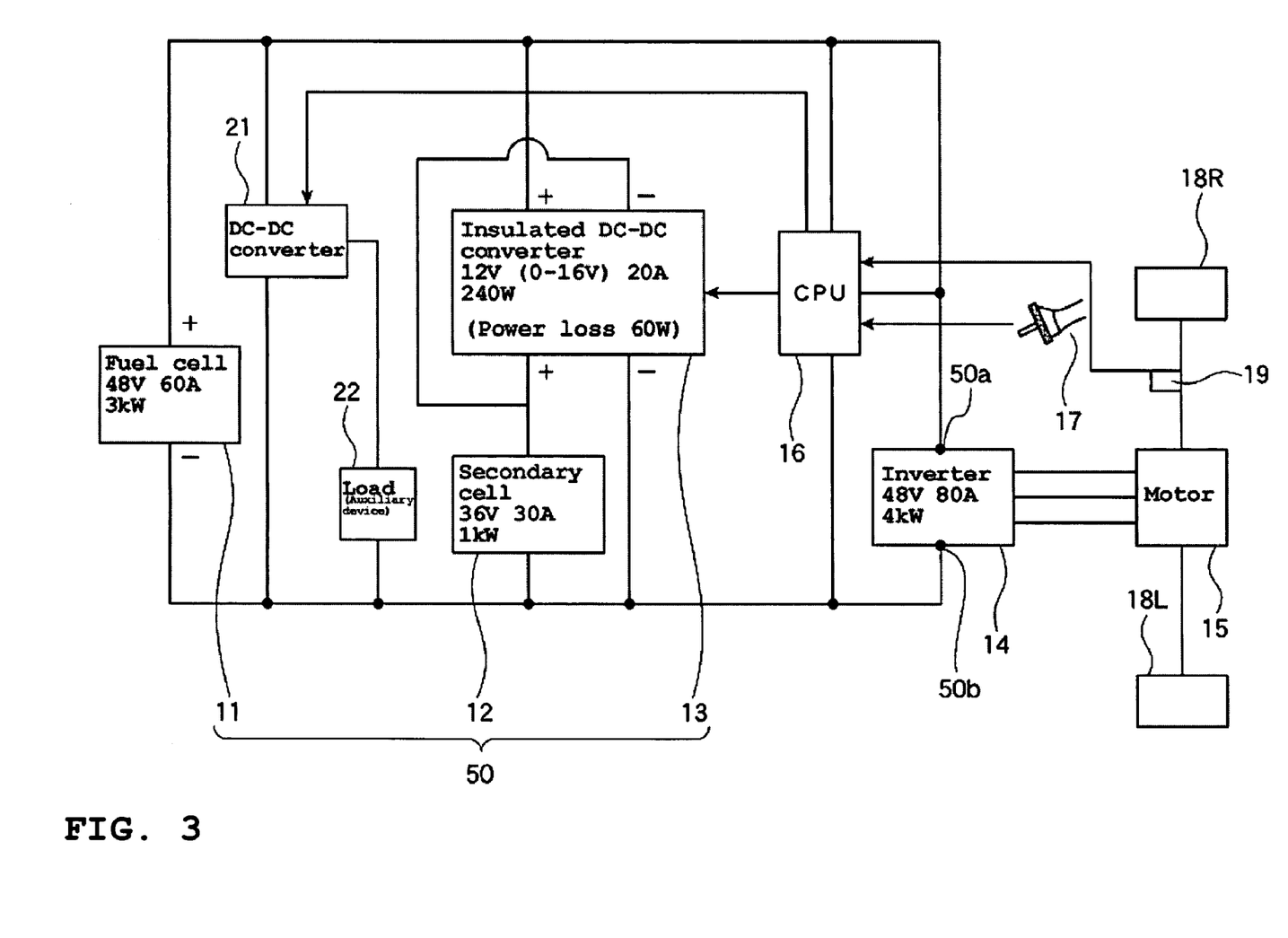
FIG. 3 is a schematic view of a configuration of an additional embodiment of a DC power source connected to a motor through an inverter.

FIG. 3 illustrates another embodiment of a DC power source 50. The DC power source 50 is similar to the DC power source 10 discussed above with reference to FIG. 2, except as noted below. Thus, the reference numerals used to designate the various components of the DC power source 50 are identical to those used for identifying the corresponding components of the DC power source 10. Though certain values for voltage, current and power are illustrated in FIG. 3, one of ordinary skill in the art will recognize that these values are only examples and that the fuel cell 11, secondary cell 12, DC-DC converter 13 and inverter 14 can operate at other suitable voltage, current and power values.

The difference of the DC power source 50 from the DC power source 10 in FIG. 2 is that the arrangement of the fuel cell 11 and the secondary cell 12 is switched. Thus, in the illustrated embodiment, the secondary cell 12 is the "first cell" and the fuel cell 11 is the "second cell". In addition, the reference numerals 50a and 50b are a pair of terminals of the DC power source 50.

The actions and effects produced in the insulation type DC-DC converter 13 are the same as in the DC power source 10.

Figure 4:
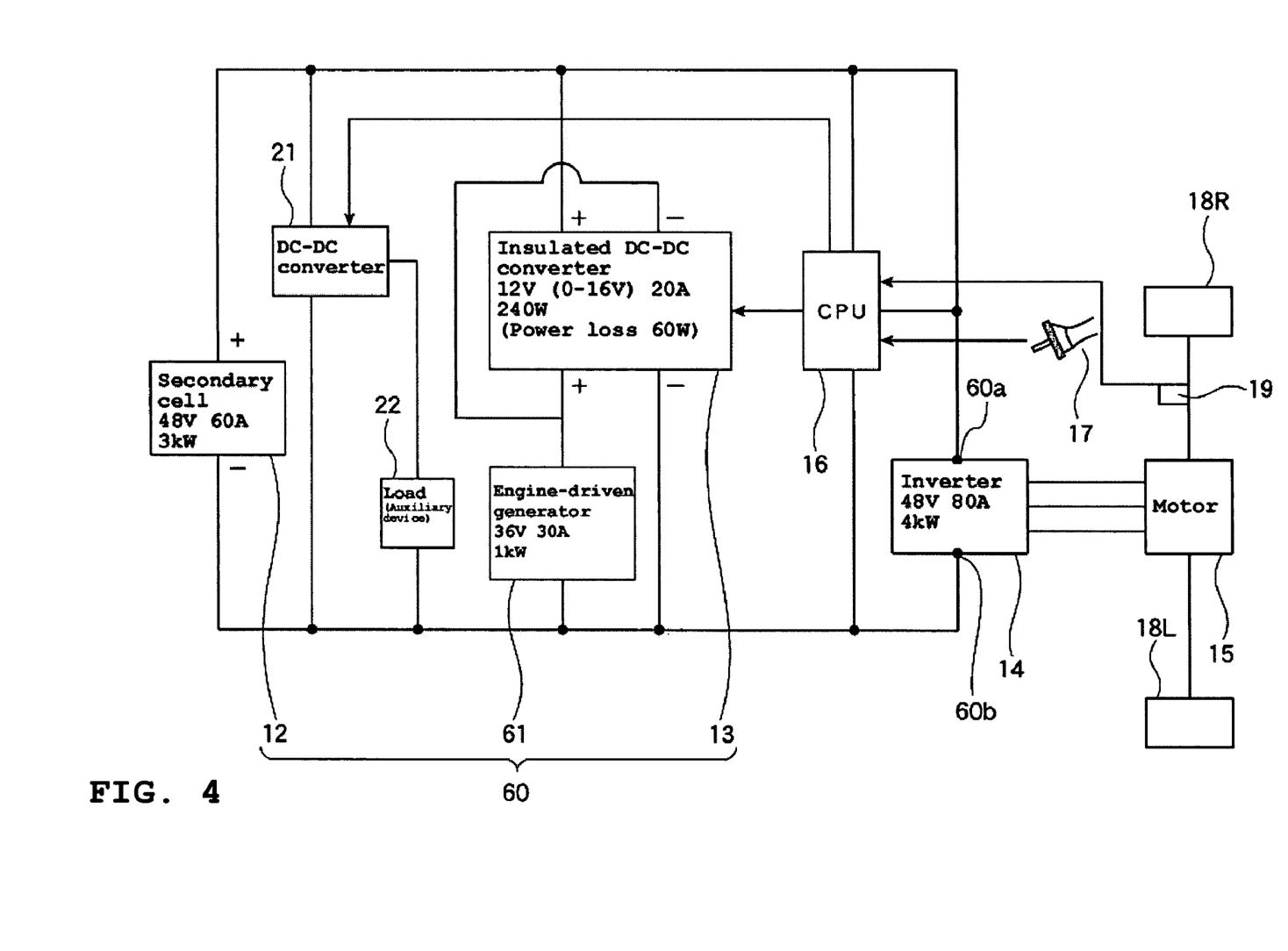
FIG. 4 is a schematic view of a configuration of a further embodiment of a DC power source connected to a motor through an inverter.

FIG. 4 illustrates another embodiment of a DC power source 60. The DC power source 60 is similar to the DC power source 10 discussed above with reference to FIG. 2, except as noted below. Thus, the reference numerals used to designate the various components of the DC power source 60 are identical to those used for identifying the corresponding components of the DC power source 10. Though certain values for voltage, current and power are illustrated in FIG. 4, one of ordinary skill in the art will recognize that these values are only examples and that the components of the DC power source 60 can have other suitable voltage, current and power values.

The difference of the DC power source 60 from the DC power source 10 in FIG. 2 is that an engine driven type generator 61 is provided instead of the fuel cell 11 in the DC power source 10. Thus, in the illustrated embodiment, the engine driven type generator 61 is the "first cell" and the secondary cell 12 is the "second cell". In addition, the reference numerals 60a and 60b are a pair of terminals in the DC power source 60.

In the illustrated embodiment, the efficiency that the electric power produces at the engine driven type generator 61 and the secondary cell 12 is utilized as the load for the DC power source 60 increases. Thus, the output efficiency of the DC power source 60 with a combined use of the engine driven type generator 61 and the secondary cell 12 is improved.

The actions and effects produced in the insulation type DC-DC converter 13 are the same as in the DC power source 10.

Figure 5:
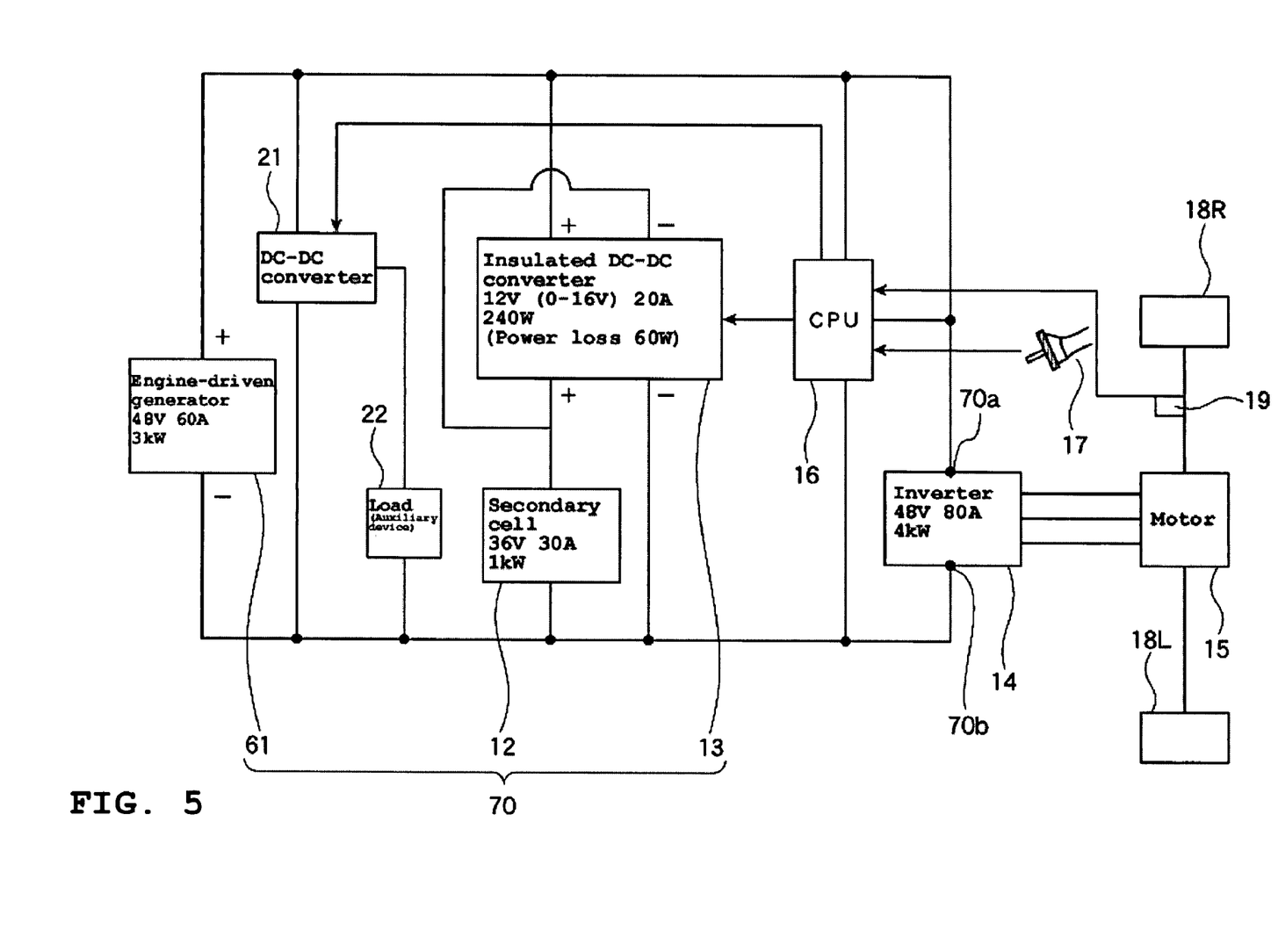
FIG. 5 is a schematic view of a configuration of another embodiment of a DC power source connected to a motor through an inverter.

FIG. 5 illustrates another embodiment of a DC power source 70. The DC power source 70 is similar to the DC power source 60 discussed above with reference to FIG. 4, except as noted below. Thus, the reference numerals used to designate the various components of the DC power source 70 are identical to those used for identifying the corresponding components of the DC power source 60. Though certain values for voltage, current and power are illustrated in FIG. 5, one of ordinary skill in the art will recognize that these values are only examples and that the components of the DC power source 70 can have other suitable voltage, current and power values.

The difference of the DC power source 70 from the DC power source 60 in FIG. 4 is that the arrangement of the engine driven type generator 61 and the secondary cell 12 is switched. Thus, in the illustrated embodiment, the secondary cell 12 is the "first cell" and the engine driven type generator 61 is the "second cell". In addition, the reference numerals 70a and 70b are a pair of the terminals in the DC power source 70.

The actions and effects produced in the insulation type DC-DC converter 13 are the same as in the DC power source 60.

Figure 6:
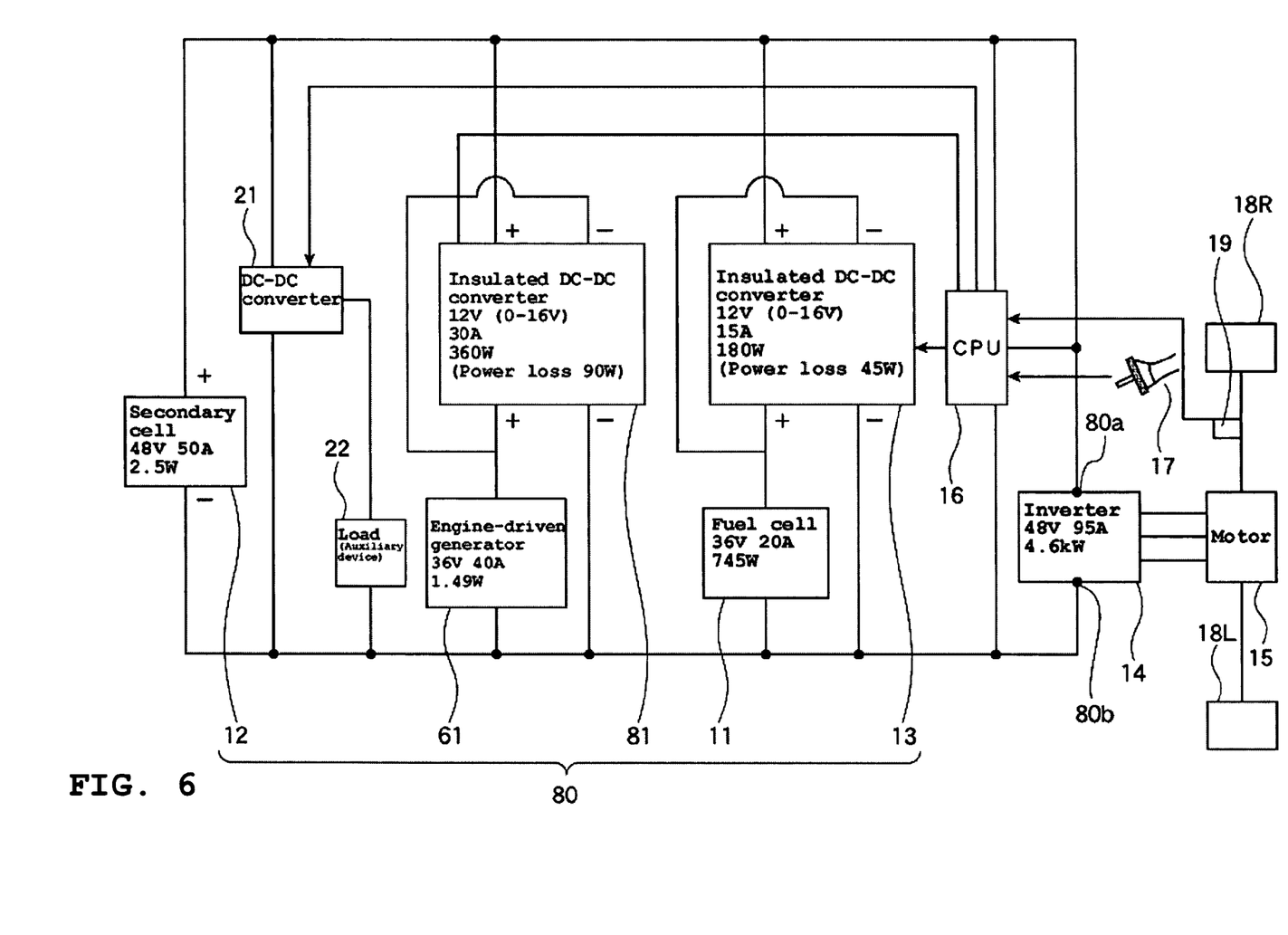
FIG. 6 is a schematic view of a configuration of a further embodiment of a DC power source connected to a motor through an inverter.

FIG. 6 illustrates another embodiment of a DC power source 80. The DC power source 80 is similar to the DC power source 10 discussed above with reference to FIG. 2, except as noted below. Thus, the reference numerals used to designate the various components of the DC power source 80 are identical to those used for identifying the corresponding components of the DC power source 10. Though certain values for voltage, current and power are illustrated in FIG. 6, one of ordinary skill in the art will recognize that these values are only examples and that the components of the DC power source 80 can have other suitable voltage, current and power values.

The difference of the DC power source 80 from the DC power source 10 in FIG. 2 is that the fuel cell 11 and the secondary cell 12 are connected in parallel to a pair of terminals 80a and 80b and, in addition to that, the engine driven type generator 61 is connected in parallel. Also, an insulation type DC-DC converter 81 is connected to the engine driven type generator 61 in series.

In the illustrated embodiment, approximately 4.6 kW of power is inverted by the inverter 14 with a voltage of 48V and a current of 95 A and transmitted to the motor 15, as described below.

Approximately 745 W power is produced with a voltage of 36V and a current of 20 A at the fuel cell 11 and, combining with the insulation type DC-DC converter 13, the net power source can be assumed to be approximately 700 W with a voltage of 48V and a current of 15 A.

Also, at the secondary cell 12, approximately 2.5 kW power is produced with a voltage of 48V and a current of 50 A.

In addition, at the engine driven type generator 61, approximately 1.49 kW of power is produced with a voltage of 36V and a current of 40 A and, combining with the insulation type DC-DC converter 81, the net power source can be assumed to be approximately 1.4 kW with a voltage of 48V and a current of 30 A.

However, assuming that the efficiency of the insulation type DC-DC converters 13 and 81 is 80%, a power loss at the insulation type DC-DC converter 13 is approximately 45 W and a power loss at the insulation type DC-DC converter 81 is approximately 90 W. Therefore, to output a power of 4.6 kW to the inverter 14, the fuel cell 11 needs to supplement the power loss of approximately 45 W at the insulation type DC-DC converter 13, and the engine driven type generator 61 needs to supplement the power loss of approximately 90 W at the insulation type DC-DC converter 81.

In the DC power source 80, the fuel cell 11, the secondary cell 12 and the engine driven type generator 61 are all connected in parallel to the pair of terminals 80a and 80b, and each insulation type DC-DC converter 13 and 81 are individually connected to the fuel cell 11 and the engine driven type generator 61, that are any two among the fuel cell 11, the secondary cell 12 and the engine driven type generator 61, in series. Therefore, power output from the two insulation type DC-DC converters 13 and 81 can be decreased, so output power can be decreased. Thus, the output power loss at the two insulation type DC-DC converters 13 and 81 can be reduced.

Also, in such DC power sources 10, 50, 60, 70, and 80, the motor 15 is connected to the DC power sources 10, 50, 60, 70, and 80 through the inverter 14. Thus, the motor 15 can be driven efficiently with the DC power sources 10, 50, 60, 70, and 80 with less power loss.

In addition, the DC power sources 10, 50, 60, 70, and 80 are connected to the motor 15 constituting a "drive unit" or a part of "drive unit" through the inverter. However, the application is not limited to the embodiments described above. The present invention is applicable to a "drive unit" as a driving part of vehicles and so forth including the motor 15, a "drive unit" as vehicles and the like including this driven part, and other devices that exclude the motor 15.

Although this invention has been disclosed in the context of a certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims.

What is claimed is:

1. A DC power source comprising:
a pair of terminals for outputting electric power;
a first cell and a second cell connected in parallel to the pair of terminals; and
an insulation type DC-DC converter connected in series to either one of the first cell or the second cell.

2. The DC power source of claim 1, wherein the first cell is a fuel cell and the second cell is a secondary cell.

3. The DC power source of claim 2, wherein the DC-DC converter is connected in series with the fuel cell.

4. The DC power source of claim 2, wherein the secondary cell is a battery.

5. The DC power source of claim 1, wherein the insulation type DC-DC converter is configured to provide a variable voltage.

6. The DC power source of claim 5, wherein the voltage of the DC-DC converter is variable between about 0V and about 16V.

7. The DC power source of claim 6, wherein the pair of terminals are connected to a drive unit via an inverter.

8. The DC power source of claim 7, wherein the drive unit is a motor.

9. The DC power source of claim 7, wherein the drive unit is configured to drive a vehicle.

10. The DC power source of claim 9, further comprising a controller configured to communicate with the insulation type DC-DC converter to control the operation of the DC-DC converter, the controller configured to receive signals from an accelerator of the vehicle and a sensor configured to detect a rotational speed of the motor.

11. The DC power source of claim 10, wherein the first sell is a fuel cell connected in series with the insulation type DC-DC converter and the second cell is a secondary cell.

12. The DC power source of claim 10, wherein the first cell is a secondary cell connected in series with the insulation type DC-DC converter and the second cell is a fuel cell.

13. The DC power source of claim 10, wherein the first cell is an engine-driven type generator connected in series with the insulation type DC-DC converter and the second cell is a secondary cell.

14. The DC power source of claim 10, wherein the first cell is a secondary cell connected in series with the insulation type DC-DC converter and the second cell is an engine-driven type generator.

15. A DC power source, comprising:
a pair of terminals for outputting electric power;
a fuel cell;
a secondary cell;
an engine-driven type generator, the fuel cell, secondary cell and engine-driven type generator connected in parallel to the pair of terminals; and
at least one insulation type DC-DC converter, each insulation type DC-DC converter individually connected in series to one of the fuel cell, the secondary cell and the engine driven type generator.

16. The DC power source of claim 15, wherein the at least one insulation type DC-DC converter comprises a first insulation type DC-DC converter connected in series to the fuel cell, and a second insulation type DC-DC converter connected in series to the engine-driven type generator.

17. A DC power source, comprising:
a pair of terminals for outputting electric power;
a first cell and a second cell connected in parallel to the pair of terminals; and
at least one insulation type DC-DC converter, each insulation type DC-DC converter connected to one of the first cell and the second cell; and
means for reducing power loss at the at least one insulation-type DC-DC converter.

18. The DC power source of claim 17, wherein the first cell is chosen from a group consisting of a fuel cell, a secondary cell and engine-driven type generator.

19. The DC power source of claim 17, wherein the second cell is chosen from a group consisting of a fuel cell, a secondary cell and engine-driven type generator.

20. The DC power source of claim 17, further comprising a third cell connected in parallel to the pair of terminals, the first cell being a fuel cell connected to a first DC-DC converter, the second cell being an engine-driven type generator connected to a second DC-DC converter, and the third cell being a secondary cell.

21. The DC power source of claim 17, further comprising a controller configured to control the operation of the at least one DC-DC converter.

22. A method for operating a DC power source connected to a drive unit for a vehicle, comprising:
receiving a signal from an accelerator of the vehicle;
receiving a signal from a sensor configured to detect a rotational speed of the drive unit of the vehicle;
controlling the operation of a DC-DC converter at least in part in response to said received signals to vary the voltage of the DC-DC converter;
decreasing a voltage of a fuel cell of the vehicle if a current flowing through the fuel cell is above a predetermined value; and
varying the voltage of the DC-DC converter to supplement the decrease in voltage in the fuel cell.

* * * * *

UNITED STATES PATENT AND TRADEMARK OFFICE
CERTIFICATE OF CORRECTION

PATENT NO.       : 7,402,967 B2
APPLICATION NO.  : 11/482371
DATED            : July 22, 2008
INVENTOR(S)      : Atsushi Kurosawa It is certified that error appears in the above-identified patent and that said Letters Patent is hereby corrected as shown below:

At column 1, line 17, after "type" insert -- DC-DC --.

At column 2, line 4, please delete "DC-power" and insert -- DC power -- therefor.

At column 2, line 22, please delete "750 w" and insert -- 750 W -- therefor.

At column 2, line 26, please delete "750 w" and insert -- 750 W -- therefor.

Signed and Sealed this

Sixth Day of January, 2009

JON W. DUDAS
*Director of the United States Patent and Trademark Office*